(12) United States Patent
Salter et al.

(10) Patent No.: US 11,801,767 B2
(45) Date of Patent: Oct. 31, 2023

(54) CONTROL OF VEHICLE AND HOME ENERGY STORAGE SYSTEMS

(71) Applicant: FORD GLOBAL TECHNOLOGIES, LLC, Dearborn, MI (US)

(72) Inventors: Stuart C. Salter, White Lake, MI (US); Ryan O'Gorman, Beverly Hills, MI (US); Timothy Harris, Grosse Ile, MI (US); Peter Phung, Windsor (CA); Katherine Howard-Cone, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/573,865

(22) Filed: Jan. 12, 2022

(65) Prior Publication Data
US 2023/0219455 A1 Jul. 13, 2023

(51) Int. Cl.
*B60L 55/00* (2019.01)
*B60L 53/51* (2019.01)
*B60L 53/52* (2019.01)
*B60L 58/12* (2019.01)
*B60L 53/62* (2019.01)
*H02J 3/00* (2006.01)

(52) U.S. Cl.
CPC .............. *B60L 55/00* (2019.02); *B60L 53/51* (2019.02); *B60L 53/52* (2019.02); *B60L 53/62* (2019.02); *B60L 58/12* (2019.02); *H02J 3/004* (2020.01); *B60L 2240/54* (2013.01)

(58) Field of Classification Search
CPC .......... B60L 55/00; B60L 53/51; B60L 53/52; B60L 53/62; B60L 58/12; B60L 2240/54; H02J 3/004
See application file for complete search history.

(56) References Cited

U.S. PATENT DOCUMENTS

| | | | |
|---|---|---|---|
| 8,581,545 B2 | 11/2013 | Obayashi et al. | |
| 8,718,850 B2 | 5/2014 | Bozchalui et al. | |
| 2012/0249065 A1* | 10/2012 | Bissonette | ............ B60L 53/665 320/109 |

FOREIGN PATENT DOCUMENTS

KR 20200061008 A 6/2020

* cited by examiner

*Primary Examiner* — Lincoln D Donovan
*Assistant Examiner* — Alex W Lam
(74) *Attorney, Agent, or Firm* — David B Kelley; Brooks Kushman P.C.

(57) ABSTRACT

Responsive to indication that a predicted amount of solar or wind power from a power generating event will exceed a power storage capability of one or more power storage devices configured to receive the solar or wind power, controllers may command the one or more power storage devices to discharge energy to a power grid before the power generating event such that the power storage capability of the one or more power storage devices increases.

16 Claims, 5 Drawing Sheets

CONTROL OF VEHICLE AND HOME ENERGY STORAGE SYSTEMS

TECHNICAL FIELD

The present disclosure relates to systems for coordinating electric energy storage between various entities.

BACKGROUND

A home energy ecosystem (HEE) may include various components such as home energy storage (HES), an electric vehicle, an appliance, a thermostat, a solar panel and other devices operated and controlled via a home energy management system (HEMS). The HEMS may coordinate various components of the ecosystem to enhance convenience, increase efficiency and reduce energy cost.

SUMMARY

A power system includes one or more controllers that, responsive to indication that a predicted amount of solar or wind power from a power generating event will exceed a power storage capability of one or more power storage devices configured to receive the solar or wind power, commands the one or more power storage devices to discharge energy to a power grid before the power generating event such that the power storage capability of the one or more power storage devices increases.

A method includes responsive to indication that energy stored in a traction battery is insufficient to satisfy a request to transfer energy to a power grid, charging the traction battery to increase a state of charge of the traction battery to a target value that is based on a predicted amount of solar or wind power, and subsequently discharging the traction battery to the power grid, and responsive to indication that available solar or wind power exceeds an amount of power sufficient to satisfy the request, charging the traction battery with some of the solar or wind power.

A power system includes one or more controllers that command that available solar or wind power charge a traction battery of a vehicle, and during presence of a request for energy transfer to a power grid, command that the available solar or wind power satisfy the request and that the available solar or wind power in excess of an amount necessary to satisfy the request charge the traction battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
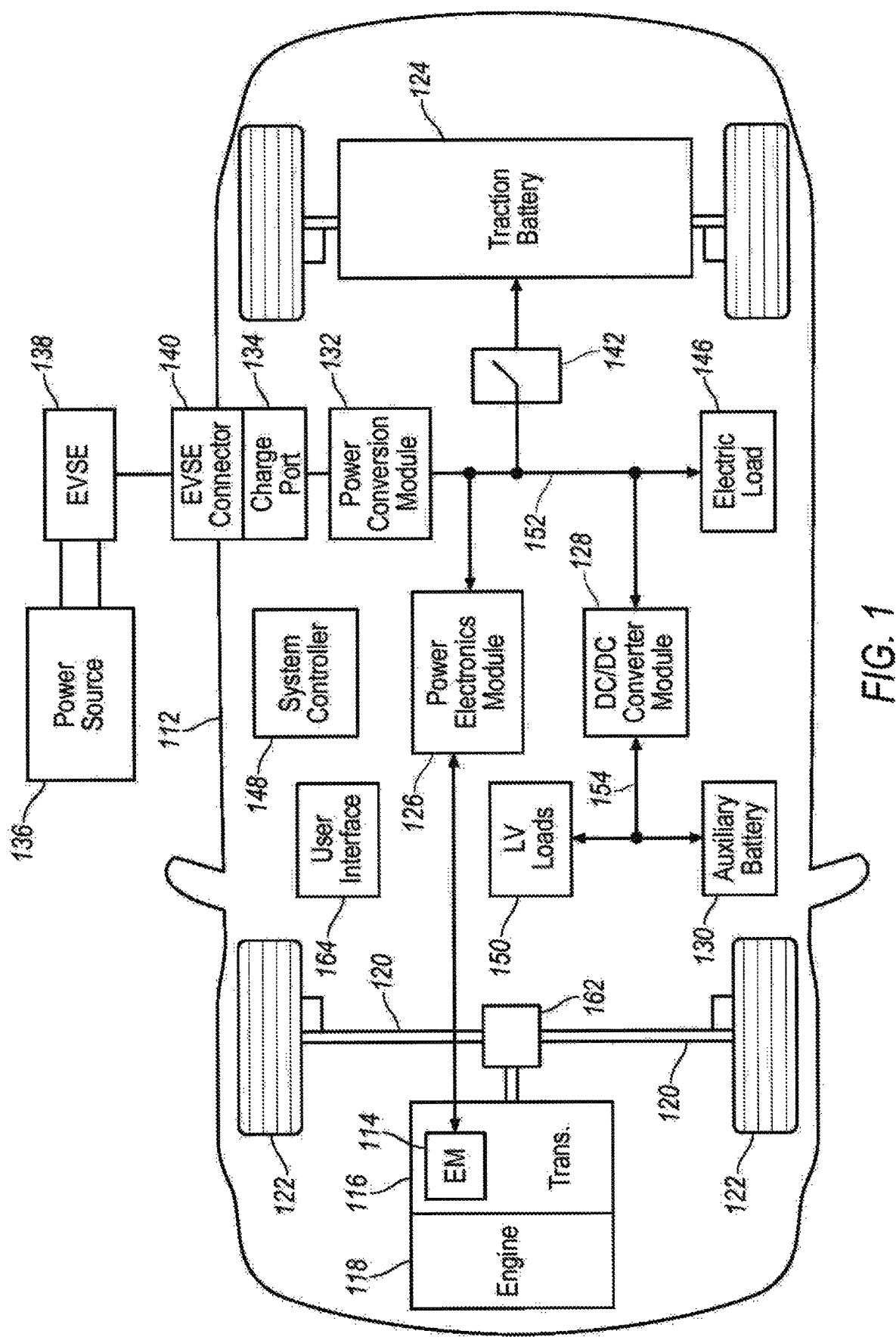
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a Battery Electric Vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus/rail. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling. Additionally, the vehicle 112 may be configured to provide electric power from the traction battery 124 to off-board power storage and/or a power grid (not shown) via the EVSE 138 and EVSE connection 140 under the control of controllers such as the power conversion module 132 or one or more remote controllers such as a cloud server (not shown). Alternatively, the power transfer from the traction battery 124 to the off-board load (e.g. the HES) may be performed without utilizing the power conversion module 132 since both the traction battery 124 and the HES are DC power. Transferring from the traction battery 124 to the power grid may require utilizing the power conversion module 132 as the power grid may be on AC power only. The traction battery 124 may be directly connected to the charge port to transfer and/or receive DC power. For instance, the EVSE 138 may be integrated or associated with a home having a HES as power backup. The vehicle 112 may be operated as a portable power storage to transfer power from and to the HES coordinated by a HEMS (to be described in detail below).

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
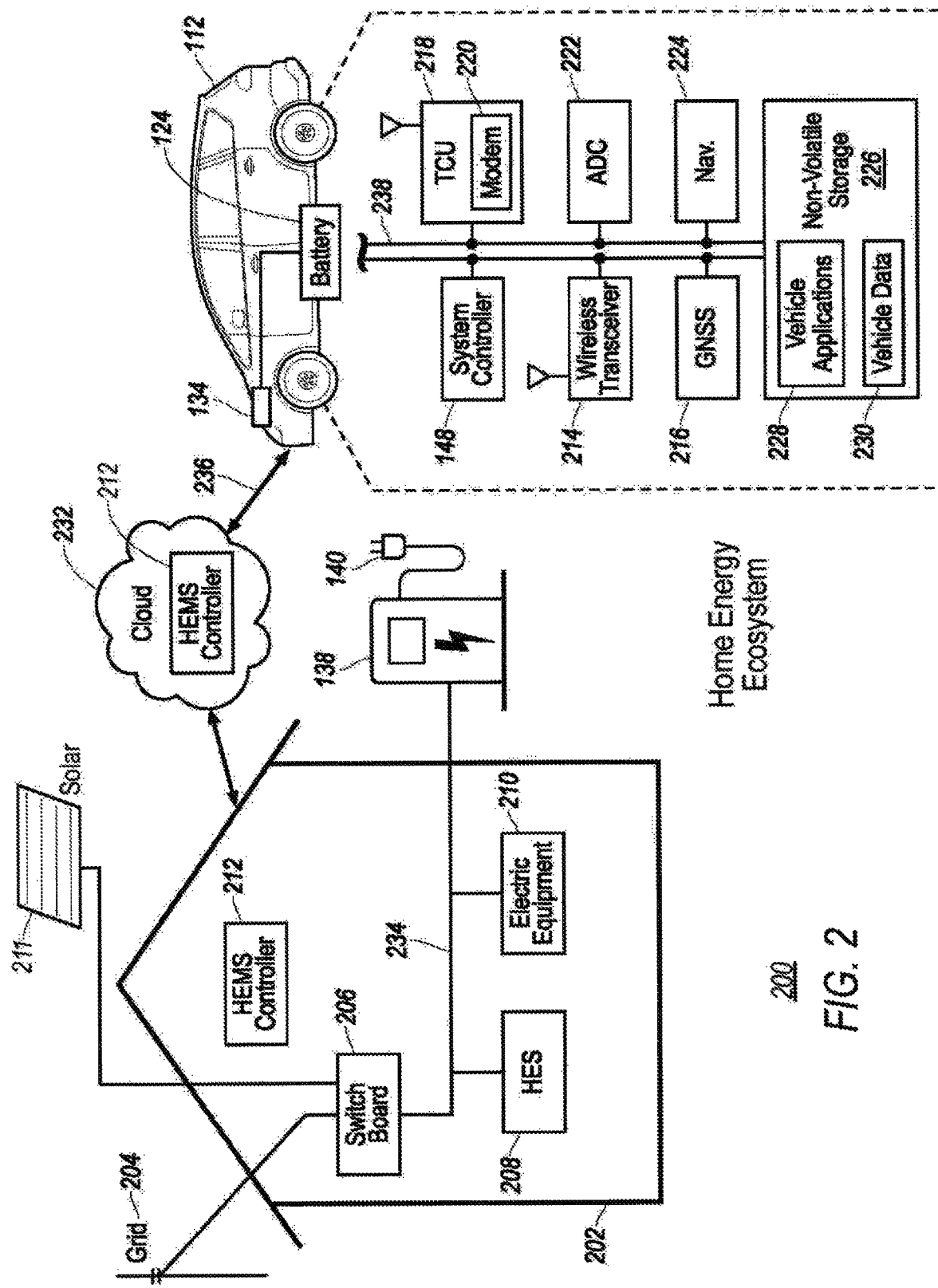
FIG. 2 is a diagram of a HEMS associated with an electric vehicle.

FIG. 2 depicts a diagram of a home energy management system associated with an electric vehicle. A home energy ecosystem (HEE) 200 in the present example may be implemented for a house/building 202. The house 202 may access electric power from a power grid 204 via a switch board 206 configured to provide various components of the HEE 200 with electric power via an internal powerline 234. For instance, the HEE 200 may include one or more electric equipment 210 (e.g. appliance) configured to consume electricity and provide various features to the household. The HEE 200 may further include a HES 208 configured to store electric energy. The HES 208 may be implemented in various forms. As an example, the HES 208 may include a rechargeable battery (e.g. lithium-ion battery) to store electric energy received from the grid 204 (or other sources) and to provide the electric energy to the internal powerline 234 whenever needed. Since the electric energy may be stored as DC power in the HES 208, one or more DC/AC inverters may be provided with the HES 208 for power transitions. The house 202 may be further connected to a solar panel 211 via the switch board 206. The solar panel 211 may be configured to generate and supply electric power to the HES 208 via the internal power line 234. The solar panel 211 may generate a DC electric power having a voltage that is the same or different from the voltage of the HES 208. In one example, the solar panel 211 may be configured to charge the HES 208 via one or more DC/DC converters. Alternatively, one or more DC/AC inverters may be provided with the solar panel 211 and/or the switch board for power transitions. It is noted that although the solar panel 211 is provided to the house 202 for electric power generating in the present embodiment, the present disclosure is not limited thereto. In other words, the house 202 may be provided with other means of power generating capabilities such as a wind, turbine or the like.

With continuing reference to FIG. 1, the internal powerline 234 may be further connected to an EVSE 138 configured to transfer electric energy with an electric vehicle 112. The EVSE 138 may be installed within or near the house 202 (e.g. in a garage) and adapted to a home electric energy configuration having a predefined voltage and maximum current supported by the switch board 206. As discussed with reference to FIG. 1, the EVSE 138 may be configured to connect to the vehicle 112 via the charge port 134 to charge the traction battery 124. Additionally, the EVSE 138 may be further configured to draw electric power from the traction battery 124 of the vehicle 112 to supply power to the HEE 200 or the grid 204. For instance, in case of a power outage or shortage from the grid 204, the EVSE 138 may be configured to draw electric power from the vehicle 112 to power the components of the house 202. Additionally or alternatively, the EVSE 138 may be configured to draw electric power from the solar panel 211, the HES 208 and/or the traction battery 124 to supply power to the grid 204.

The power management of the HEE 200 may be controlled and coordinated by a HEMS controller 212 associated with house 202. The HEMS controller 212 may be implemented in various manners. For instance, the HEMS controller 212 may be a dedicated controller located within the house 202 and connected to components of the home energy ecosystem or smart home devices HEE 200 via wired or wireless connections (not shown). Alternatively, the HEMS controller 212 may be remotely implemented via a cloud server through the Internet and configured to remotely monitor and control the operations of components of the HEE 200. In any or all of the above implementation examples, the HEMS controller 212 may be provided with software to monitor and control the operations of the various components of the home energy ecosystem HEE 200. The HEMS controller 212 may be further provided with an interface associated with input and output devices to interact with a user of the HEE 200. The HEMS 212 may be further connected to a cloud 232 via a public or private network to communicate with other entities such as the utility company and weather agencies to facilitate the planning and controlling of the HEE 200. In one example, the HEMS controller 212 may be implemented via the cloud server 232 through software without dedicated hardware structure for the house 202. It is noted that the term cloud 232 recited in the present disclosure is used as a general term and may include any computing network involving carriers, router, computers, controllers, circuitries, servers or the like configured to store data and perform data processing functions and facilitate communication between various entities.

With continuing reference to FIG. 1, the vehicle 112 may further include various components to facilitate the power transaction between the battery 124, the EVSE 138 and the grid 204. The vehicle 112 may include a system controller 148 configured to perform instructions, commands and other routines in support of the processes described herein. For instance, the system controller 148 may include one or more processors and be configured to execute instructions of vehicle application 228 to provide features such as wireless communication and power management. Such instructions and other data may be maintained in a non-volatile manner using a variety of computer-readable storage medium 226. The computer-readable medium 226 (also referred to as a processor-readable medium or storage) may include any non-transitory medium (e.g. tangible medium) that participates in providing instructions or other data that may be used by the system controller 148. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and structured query language (SQL).

The vehicle 112 may further be provided with navigation and route planning features through a navigation controller 224 configured to calculate navigation routes responsive to user input via e.g. HMI controls (not shown) and output planned routes and instructions via an output device such as a speaker or a display (not shown). Location data that is needed for navigation may be collected from a global navigation satellite system (GNSS) controller 216 configured to communicate with multiple satellites and calculate the location of the vehicle 112. The GNSS controller 216 may be configured to support various current and/or future global or regional location systems such as global positioning system (GPS), Galileo, Beidou, Global Navigation Satellite System (GLONASS) and the like. Map data used for route planning may be stored in the storage 226 as a part of the vehicle data 230. Navigation software may be stored in the storage 226 as a part of the vehicle applications 228.

The vehicle 112 may be further configured to wirelessly communicate with a variety of digital entities via a wireless transceiver 214. For instance, the vehicle 112 may be configured to communicate with the HEMS controller 212 (local or remote) via the wireless transceiver 214 to perform various operations. Additionally or alternatively, the communication between the vehicle 112 and the HEMS controller may be enabled by the EVSE connector 140 coupled with the charge port 134 configured to support digital communication protocols. The wireless transceiver 214 may be configured to support a variety of wireless communication protocols enabled by wireless controllers (not shown) in communication with the wireless transceiver 214. As a few non-limiting examples, the wireless controllers may include a Wi-Fi controller, a Bluetooth controller, a radio-frequency identification (RFID) controller, a near-field communication (NFC) controller, and other devices such as a Zigbee transceiver, an IrDA transceiver, an ultra-wide band (UWB) transceiver, or the like.

The vehicle 112 may be further provided with a telematics control unit (TCU) 218 configured to control telecommunication between the vehicle 112 and the cloud 232 through a wireless connection 236 using a modem 220. The wireless connection 236 may be in the form of various communication networks (e.g. cellular network). Through the wireless connection 236, the vehicle 112 may access one or more servers of the cloud 232 to access various content for various purposes. The various components of the vehicle 112 introduced above may be connected to each other via in-vehicle network 238. The in-vehicle network 238 may include, but is not limited to, one or more of a controller area network (CAN), an Ethernet network, and a media-oriented system transport (MOST), as some examples.

The HEMS controller 212 may be configured to control and coordinate the energy distribution of the house 202 based on various factors. For instance, due to the operational nature of the solar panel 211, electricity may only be generated during daytime with sufficient sunlight. The HEMS controller 212 may anticipate and determine the amount of electric power to be generated by the solar panel 211 using weather report information indicative of the time and condition of the sunlight to coordinate a power arbitration process and optimize an energy profile of the household 202. The power arbitration may be performed in a variety of manners. For instance, the HEMS controller 212 may apply a balanced arbitration strategy to evenly distribute the power generated by the solar panel 211 to multiple entities. The HEMS 212 may evenly divide the solar power and distribute to the HES 208 and the vehicle 112 (if connected). The HEMS 212 may further distribute the solar power to the grid 204. Alternatively, the HEMS controller 212 may apply a charging rate/capacity-based arbitration strategy to distribute the solar power based on how fast and how much each entity may receive the electric charge. In general, the traction battery 124 of the vehicle 112 may have a higher capacity to receive charge in terms of both the speed and the capacity. Responsive to detecting the vehicle 112 is connected to the EVSE 138, the HEMS controller 212 may distribute more power to the vehicle battery 124. Alternatively, the HEMS controller 212 may apply a demand-based aggregation strategy to distribute the solar power based on the predicted power demand from various entities. For instance, the HEMS controller 212 may obtain a user schedule (e.g. from the vehicle 112) to determine an upcoming trip for the vehicle and the amount of charge needed by the trip. The HEMS controller 212 may further determine an upcoming electric equipment 210 usage based on a prior use record. Furthermore, the HEMS controller 212 may receive a message from the grid 204 indicative of a peak hour demanding power output from the HEE 200 to the grid 204 at a given time. The HEMS controller 212 may coordinate the solar power distribution using the above one or more power demand information accordingly. Alternatively, if both the HES 208 and the traction battery 124 are full of charge, the HEMS controller 212 may supply the solar power 211 to the grid by default.

Figure 3:
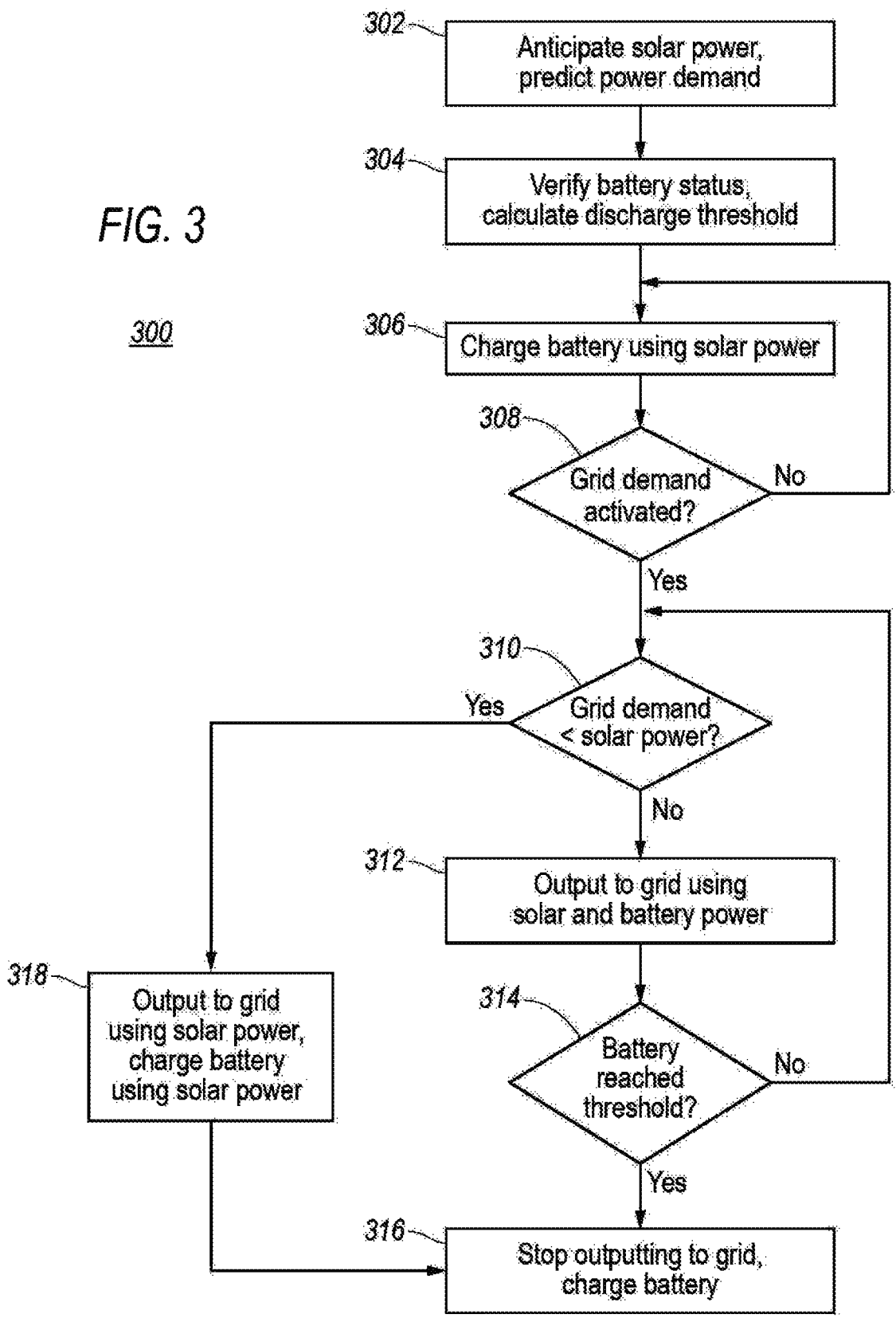
FIG. 3 is a flow diagram for a process of one embodiment.

Referring to FIG. 3, an example flow diagram for a process 300 of one embodiment of the present disclosure is illustrated. With continuing reference to FIGS. 1 and 2, the process 300 may be implemented via the HEMS controller 212. At operation 302, the HEMS controller 212 anticipates an upcoming solar power generation using weather information from the cloud 232, and predicts power demand of various entities associated with the house 202 during the period of time when the solar power is available. The HEMS controller 212 may calculate an anticipated power generation amount using the weather information. The power demand may be determined through past power usage record associated with the house 202. At operation 304, the HEMS controller 212 verifies the state of charge (SOC) of one or more batteries (power storages) such as the HES 208 and/or vehicle battery 124 connected to the house 202. The HEMS controller 212 further calculates a discharge threshold for each battery associated with the house indicative of a lower limit SOC above which transferring to the grid 204 is allowed (to be discussed in detail below). Responsive to verifying the SOCs of the batteries are not full and have room for accepting the solar power, at operation 306, the HEMS controller 212 operates the solar panel 211 to charge the one or more batteries connected to the house 202 using the solar power once the anticipated operation hours have been reached. In addition to supplying the solar power to the household 202, the HEMS controller 212 may further coordinate the house 202 to transfer electric power to the grid for utility credits. At operation 308, the HEMS controller 212 verifies if a grid demand condition is met. The grid demand condition may be indicative of a condition that the house 202 may supply electric power to the grid. For instance, the grid demand condition may include a predetermined time that the grid 204 is in high demand (e.g. peak hours). Alternatively, the grid demand condition may include a message received from a utility company requesting power from the house 202. If the answer for operation 308 is a no, the process 300 returns to operation 306 to continue charging the batteries using the solar power. Otherwise, if the grid demand condition is met, the process proceeds to operation 310 and the HEMS controller 212 verifies if the current solar power is sufficient to satisfy the grid demand. If the answer is a no, the process proceeds to operation 312 and the HEMS controller 212 operates to transfer electric power for the house 202 to the grid using both the solar power and the battery power. The HEMS controller 212 may command the house 202 to transfer electric power to the grid using not only the solar power, but also power from the batteries such as the HES and/or the traction battery 124 (e.g. during the grid peak hour). At operation 314, the HEMS controller 212 verifies the discharge thresholds for the batteries have been met. If the answer is a no, the process returns to operation 310. Otherwise the process proceeds to operation 314 and the HEMS controller 212 stops supplying from the house 202 to the grid 204 and starts to charge the batteries associated with the house 202. If the answer for operation 310 is a yes, suggesting the power generated by the solar panel 211 alone is sufficient to satisfy the grid demand, the process proceeds to operation 318 and the HEMS controller 212 operates to transfer power from the house 202 to the grid 204 using the solar power alone, while continuing to charge the batteries using the solar power.

The operations of the process 300 may be applied to various situations, for instance, sunny weather may be anticipated from LOAM to 7 PM for tomorrow. The HEMS controller 212 may predict power demand from various entities associated with the house 202 during the solar power generating period to efficiently allocate the solar power. In this example, the HEMS controller 212 may predict the vehicle to be connected to the EVSE 138 during part of or the entire solar power generating period, and the SOC of both the traction battery 124 and the HES 208 are not full. The HEMS controller 212 may coordinate the solar panel 211 output to charge the HES 208 and the traction battery 124 when the solar power becomes available as anticipated (e.g. start at 10 AM). The HEMS controller 212 may further determine the grid 204 is to demand power from the house 202 at around 4 PM in observance with the daily peak hour. In this case, the HEMS controller 212 may plan to discharge the HES 204 and the traction battery 124 during the grid power demand period to supply power to the grid 204 until a SOC threshold is met. The SOC threshold may be calculated by the HEMS controller 212 using the predicted power demand from various entities associated with the house. Different thresholds may be applied to different batteries. For instance, responsive to detecting an upcoming trip for the vehicle requiring a given amount of charge, the HEMS controller 212 may reserve the amount of charge at the traction battery 124 to fulfill the trip demand. Responsive to detecting the corresponding battery has reached the threshold, the HEMS controller 212 may stop discharge of the battery. Additionally, the HEMS controller 212 may start to charge the battery using the solar power or the grid power.

Figure 4:
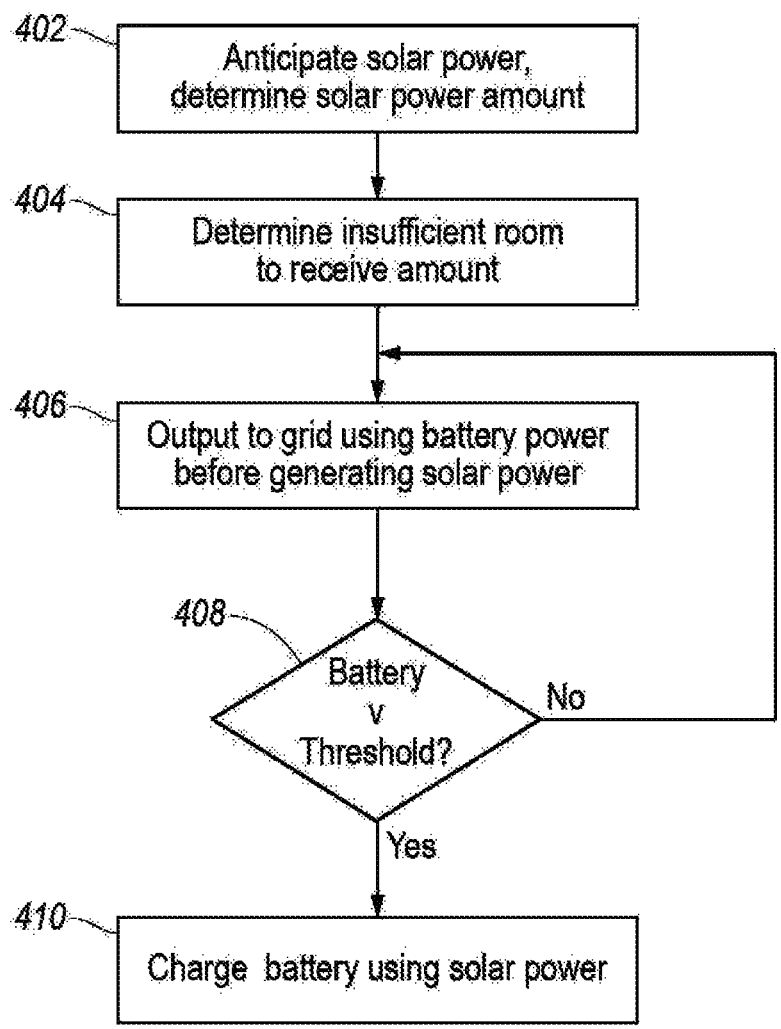
FIG. 4 is a flow diagram for a process of another embodiment.

Referring to FIG. 4, an example flow diagram for a process 400 of another embodiment of the present disclosure is illustrated. Different from the process 300 illustrated with reference to FIG. 3, the HEMS controller 212 pre-discharges the batteries before the solar power becomes available in the present example. At operation 402, the HEMS controller 212 anticipates solar power and determines an amount of charge to be generated during the solar power generating period. At operation 404, the HEMS controller 212 compares the amount of charge with the capacity of the batteries and determines the batteries SOC is too high to accommodate the solar power amount. At operation 406, the HEMS controller 212 outputs power to the grid using electric power from the batteries (e.g. the HES 204 and/or the traction battery 124) before the anticipated solar power becomes available such that the SOC of the batteries may be reduced to accommodate the soler charge. Responsive to the batteries reaching the predetermined SOC sufficient to accommodate the solar charge, the process proceeds from operation 408 to operation 410 to start to charge the batteries using the solar power.

Figure 5:
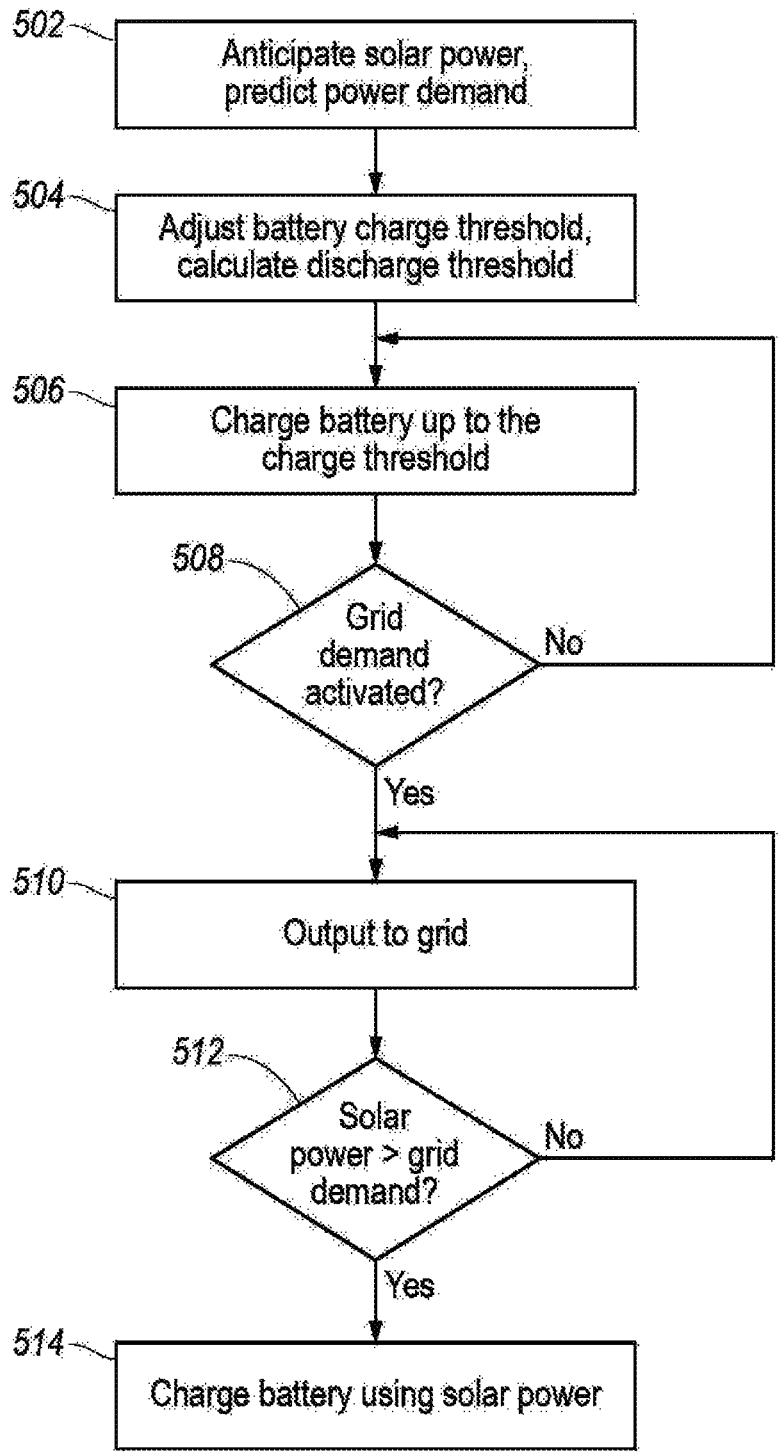
FIG. 5 is a flow diagram for a process of yet another embodiment.

Referring to FIG. 5, an example flow diagram for a process 500 of yet another embodiment of the present disclosure is illustrated. At operation 502, the HEMS controller 212 anticipates a future solar power generating event and determines the timing and power amount of the event. More particularly, the HEMS controller 212 may determine the timing when the solar power increases above the grid power demand. For instance, the grid power demand may begin before dusk. As the sun rises, the solar power gradually increases. At a certain time of the day, the solar power may exceed the grid demand at which point the extra solar power may be used to charge the batteries. The HEMS controller 212 further predicts a power demand from the grid during the full or partial power generating event. At operation 504, the HEMS controller 212 calculates a discharge threshold and adjusts a battery charge threshold using the solar power and grid power demand determined at operation 502. The battery charge threshold may be indicative of a threshold above which the one or more batteries 208, 124 will stop charging. For instance, the vehicle battery 124 may be associated with an 80% SOC by default to preserve battery health. Responsive to determining the default 80% is insufficient to satisfy the grid demand before the solar power exceeds the grid demand, the HEMS controller 212 may increase the charge threshold accordingly. At operation 506, the HEMS controller 212 operates the batteries to charge up to the adjusted charge threshold (e.g. 95%). At operation 508, responsive to the grid demand being activated, the process proceeds to operation 510 and the HEMS controller 212 transfers electric power from the house to the grid using the batteries 208, 124 as well as using the solar power. As the solar power increases during the day, at operation 512, responsive to determining the solar power has exceeded the grid power demand, the process proceeds to operation 514 and the HEMS controller 212 stops discharging the batteries 208, 124 and starts to charge the batteries using the solar power while continuing to transfer electric power to the grid using solar power.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. Other green energy sources (e.g. wind power) are also contemplated with the strategies herein.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power system comprising:
one or more controllers programmed to, responsive to indication that a predicted amount of solar or wind power from a power generating event will exceed a power storage capability of one or more power storage devices configured to receive the solar or wind power, command the one or more power storage devices to discharge energy to a power grid before the power generating event begins such that the power storage capability of the one or more power storage devices increases before the power generating event begins.

2. The power system of claim 1, wherein the one or more controllers are further programmed to command the one or more power storage devices to stop the discharge responsive to a state of charge of the one or more power storage devices achieving a discharge threshold that is based on the predicted amount and the state of charge.

3. The power system of claim 1, wherein the one or more power storage devices include a traction battery of a vehicle.

4. The power system of claim 3, wherein the one or more controllers are further programmed to command the one or more power storage devices to stop the discharge responsive to a state of charge of the one or more power storage devices achieving a discharge threshold that is based on a coming trip of the vehicle.

5. The power system of claim 1, wherein the one or more controllers are further programmed to cause the solar or wind power to charge the one or more power storage devices.

6. The power system of claim 5, wherein the one or more controllers are further programmed to cause the solar or wind power to charge the one or more power storages devices unequally such that some of the one or more power storages devices receive more of the solar or wind power than other of the one or more power storage devices.

7. The power system of claim 5, wherein the one or more controllers are further programmed to cause the solar or wind power to sequentially charge the one or more power storage devices.

8. The power system of claim 1, wherein the predicted amount of solar or wind power is based on weather data.

9. A method comprising:
responsive to indication that energy stored in a traction battery is insufficient to satisfy a request to transfer energy to a power grid, charging the traction battery to increase a state of charge of the traction battery to a target value that is based on a predicted amount of solar or wind power, and subsequently discharging the traction battery to the power grid; and responsive to indication that available solar or wind power exceeds an amount of power sufficient to satisfy the request, charging the traction battery with some of the solar or wind power.

10. The method of claim 9 further comprising transferring other of the solar or wind power to the power grid.

11. A power system comprising:
one or more controllers programmed to command that available solar or wind power charge a traction battery of a vehicle, and during presence of a request for energy transfer to a power grid, command the traction battery to discharge energy to the power grid to a discharge threshold that is based on a predicted amount of solar or wind power, command the available solar or wind power satisfy the request, and command the available solar or wind power in excess of an amount necessary to satisfy the request charge the traction battery.

12. The power system of claim 11, wherein the one or more controllers are further programmed to, command that the available solar or wind power and power from the traction battery satisfy the request.

13. The power system of claim 11, wherein the one or more controllers are further programmed to command that the available solar or wind power charge power storage devices other than the traction battery.

14. The power system of claim 13, wherein the one or more controllers are further programmed to command that more of the available solar or wind power charge the traction battery than the power storage devices other than the traction battery.

15. The power system of claim 13, wherein the one or more controllers are further programmed to command that the available solar or wind power charge the power storage devices sequentially.

16. The power system of claim 11, wherein the one or more controllers are further programmed to command the traction battery to discharge energy to the power grid before occurrence of a predicted power generating event.

* * * * *